United States Patent
Keahey et al.

(10) Patent No.: US 12,373,458 B2
(45) Date of Patent: *Jul. 29, 2025

(54) DETERMINING A COLLECTION OF DATA VISUALIZATIONS

(71) Applicant: International Business Machines Corporation, Armonk, NY (US)

(72) Inventors: T. Alan Keahey, Naperville, IL (US); Daniel J. Rope, Reston, VA (US); Graham J. Wills, Naperville, IL (US)

(73) Assignee: International Business Machines Corporation, Armonk, NY (US)

(*) Notice: Subject to any disclaimer, the term of this patent is extended or adjusted under 35 U.S.C. 154(b) by 393 days.

This patent is subject to a terminal disclaimer.

(21) Appl. No.: 17/166,894

(22) Filed: Feb. 3, 2021

(65) Prior Publication Data

US 2021/0157819 A1    May 27, 2021

Related U.S. Application Data

(63) Continuation of application No. 15/884,302, filed on Jan. 30, 2018, now Pat. No. 10,949,444, which is a
(Continued)

(51) Int. Cl.
*G06F 16/26*      (2019.01)
*G06F 16/248*     (2019.01)

(52) U.S. Cl.
CPC ............ *G06F 16/26* (2019.01); *G06F 16/248* (2019.01)

(58) Field of Classification Search
CPC .. G06F 16/26; G06F 16/2462; G06F 16/2455; G06F 16/248; G06F 16/242
See application file for complete search history.

(56) References Cited

U.S. PATENT DOCUMENTS 5,121,467 A    6/1992   Skeirik
6,012,015 A    1/2000   Tubel
(Continued)

FOREIGN PATENT DOCUMENTS

CN    103077288 A      5/2013
JP    3790699 B2   *   6/2006
(Continued)

OTHER PUBLICATIONS

IBM: List of IBM Patents or Patent Applications Treated as Related, Apr. 18, 2021, 2 pg.
(Continued)

*Primary Examiner* — Apu M Mofiz
*Assistant Examiner* — J Mitchell Curran
(74) *Attorney, Agent, or Firm* — CHIP LAW GROUP

(57) ABSTRACT

A set of transition characteristics can be identified. The set of transition characteristics can include continuities and discontinuities between data fields and data visualization channels among a plurality of data visualizations. A transition tuple for each of a plurality of pairs of the data visualizations can be determined and mapped to a matrix. The matrix can be transposed to generate vectors, each vector representing a type of transition characteristic, at least one of the vectors comprising a plurality of elements equaling a total number of the determined transition tuples. The distribution of the data fields and the data visualization channels across the data visualizations can be determined by performing statistical analysis on each of the vectors. A collection of the data visualizations can be determined based on the statistical analysis performed on each of the vectors, the collection of the data visualizations can include a subset of the data visualizations.

20 Claims, 9 Drawing Sheets

Related U.S. Application Data continuation of application No. 15/199,071, filed on Jun. 30, 2016, now Pat. No. 10,685,035.

(56) References Cited

U.S. PATENT DOCUMENTS

| | | |
|---|---|---|
| 7,072,899 B2 | 7/2006 | Lokken |
| 7,089,261 B2 | 8/2006 | Hladik, Jr. |
| 7,366,719 B2 | 4/2008 | Shaw |
| 7,426,520 B2 | 9/2008 | Gorelik |
| 7,463,263 B2 | 12/2008 | Gilboa |
| 7,584,415 B2 | 9/2009 | Cory |
| 7,603,326 B2 | 10/2009 | Bonabeau |
| 8,117,139 B2 | 2/2012 | Bonabeau |
| 8,132,122 B2 | 3/2012 | Risch |
| 8,301,585 B2 | 10/2012 | Mourey |
| 8,352,400 B2 | 1/2013 | Hoffberg |
| 8,356,000 B1 | 1/2013 | Koza |
| 8,531,451 B2 | 9/2013 | Mital |
| 8,838,510 B2 | 9/2014 | Baughman |
| 8,935,249 B2* | 1/2015 | Traub .................. G06F 16/3331 707/777 |
| 9,230,440 B1 | 1/2016 | Penilla |
| 9,336,268 B1 | 5/2016 | Moudy |
| 9,418,283 B1 | 8/2016 | Natarajan |
| 9,576,196 B1 | 2/2017 | Natarajan |
| 10,599,979 B2 | 3/2020 | Keahey |
| 10,607,139 B2 | 3/2020 | Keahey |
| 10,685,035 B2 | 6/2020 | Keahey |
| 10,949,444 B2 | 3/2021 | Keahey et al. |
| 2003/0130996 A1 | 7/2003 | Bayerl |
| 2004/0117239 A1 | 6/2004 | Mittal |
| 2005/0102325 A1 | 5/2005 | Gould |
| 2005/0192680 A1 | 9/2005 | Cascia |
| 2006/0195204 A1 | 8/2006 | Bonabeau |
| 2007/0112840 A1 | 5/2007 | Carson |
| 2008/0065685 A1 | 3/2008 | Frank |
| 2008/0077451 A1 | 3/2008 | Anthony |
| 2008/0104101 A1 | 5/2008 | Kirshenbaum |
| 2009/0096812 A1 | 4/2009 | Boixel |
| 2009/0105984 A1 | 4/2009 | Wen |
| 2009/0327883 A1 | 12/2009 | Robertson |
| 2010/0194778 A1 | 8/2010 | Robertson |
| 2011/0113003 A1 | 5/2011 | Roy |
| 2011/0261049 A1* | 10/2011 | Cardno .................. G06Q 40/04 345/419 |
| 2011/0316884 A1 | 12/2011 | Giambalvo |
| 2012/0136666 A1 | 5/2012 | Corpier |
| 2012/0159620 A1 | 6/2012 | Seifert |
| 2012/0245435 A1 | 9/2012 | Corpier |
| 2012/0313949 A1 | 12/2012 | Rope |
| 2013/0103677 A1 | 4/2013 | Chakra |
| 2013/0132042 A1 | 5/2013 | Chan |
| 2013/0166337 A1 | 6/2013 | MacGregor |
| 2013/0265319 A1 | 10/2013 | Fisher |
| 2014/0004489 A1 | 1/2014 | Kim |
| 2014/0025690 A1 | 1/2014 | Tareen |
| 2014/0039975 A1 | 2/2014 | Hill |
| 2014/0049546 A1 | 2/2014 | Wang |
| 2014/0052731 A1 | 2/2014 | Dahule |
| 2014/0108135 A1 | 4/2014 | Osborn |
| 2014/0114629 A1 | 4/2014 | Jojgov |
| 2014/0156331 A1 | 6/2014 | Cordasco |
| 2014/0205977 A1 | 7/2014 | Bak |
| 2014/0214335 A1 | 7/2014 | Siefert |
| 2014/0229164 A1 | 8/2014 | Martens |
| 2014/0247268 A1 | 9/2014 | Drucker |
| 2014/0267367 A1 | 9/2014 | Chong |
| 2014/0278738 A1 | 9/2014 | Feit |
| 2014/0279730 A1 | 9/2014 | Gamon |
| 2014/0330821 A1 | 11/2014 | Tullis |
| 2014/0354650 A1 | 12/2014 | Singh |
| 2014/0358999 A1 | 12/2014 | Rabinowitz |
| 2014/0359552 A1 | 12/2014 | Misra |
| 2015/0002518 A1 | 1/2015 | Nakajima |
| 2015/0007074 A1 | 1/2015 | Mackinlay |
| 2015/0161805 A1 | 6/2015 | Glazer |
| 2015/0220972 A1 | 8/2015 | Subramanya |
| 2015/0278371 A1 | 10/2015 | Anand |
| 2015/0279371 A1 | 10/2015 | Fujioka |
| 2015/0339301 A1 | 11/2015 | Paalborg |
| 2015/0347489 A1 | 12/2015 | Sherwin |
| 2016/0104311 A1 | 4/2016 | Allyn |
| 2016/0124960 A1* | 5/2016 | Moser .................. G06T 11/206 707/723 |
| 2016/0205137 A1 | 7/2016 | Babb |
| 2016/0217578 A1 | 7/2016 | Can |
| 2016/0335497 A1 | 11/2016 | Williams |
| 2016/0342910 A1 | 11/2016 | Chu |
| 2016/0350275 A1 | 12/2016 | Keahey |
| 2016/0379084 A1 | 12/2016 | Keahey |
| 2017/0083814 A1 | 3/2017 | Keahey |
| 2017/0213135 A1 | 7/2017 | Keahey |
| 2018/0004811 A1 | 1/2018 | Keahey |
| 2018/0173765 A1 | 6/2018 | Keahey |
| 2020/0175381 A1 | 6/2020 | Keahey |

FOREIGN PATENT DOCUMENTS

| | | |
|---|---|---|
| WO | 2009154484 A2 | 12/2009 |
| WO | 2014210521 A1 | 12/2014 |
| WO | 2015077896 A1 | 6/2015 |
| WO | WO-2016049634 A1 * | 3/2016 ........... G06F 16/904 |

OTHER PUBLICATIONS

Keahey, et al., U.S. Appl. No. 14/724,396, filed May 28, 2015, Titled: "Measuring Transitions Between Visualizations", 32 pg.

Keahy et al., U.S. Appl. No. 15/199,071, titled "Determining a Collection of Data Visualizations", filed Jun. 30, 2016, 44 pg.

Keahy et al., U.S. Appl. No. 15/884,302, titled "Determining a Collection of Data Visualizations", filed Jan. 30, 2018, 44 pg.

Keahy, et al., U.S. Appl. No. 14/862,562, filed Sep. 23, 2015, titled "Candidate Visualization Techniques for Use With Genetic Algorithms", 36 pg.

Keahy, et al., Pending U.S. Appl. No. 15/480,422, filed Apr. 6, 2017, titled "Candidate Visualization Techniques for Use With Genetic Algorithms", 36 pg.

Keahy, et al., Pending U.S. Appl. No. 16/787,848, filed Feb. 11, 2020, titled "Candidate Visualization Techniques for Use With Genetic Algorithms", 36 pg.

Agrawal, R. et al., "Querying Shapes of Histories," In Proc. of the 21st Very Large Data Bases Conf., 1995, 13 pg.

Bista et al., "Multifaceted Visualization of Annotated Social Media Data," In Big Data, IEEE Int'l. Congress on Big Data, IEEE Computer Society, Jun. 27, 2014, pp. 699-706.

Bonissone, P.P., "Lazy meta-learning: creating customized model ensembles on demand," In IEEE World Congress on Computational Intelligence (pp. 1-23) Jun. 2012.

Buche, D. et al. (2005). "Accelerating evolutionary algorithms with Gaussian process fitness function models". IEEE Transactions on Systems, Man, and Cybernetics, Part C (Applications and Reviews). Volume: 35, Issue: 2, May 2005. pp. 193-194. DOI: 10.1109/TSMCC.2004.841917 (Year: 2005).

Carty, D.M. "An Analysis of boosted regression trees to predict the strength properties of wood composites," Master's Thesis, Univ. of Tennessee, Aug. 2011, 105 pg.

Collins, C. et al., "VisLink: Revealing relationships amongst visualizations," In IEEE Transactions on Visualization and Computer Graphics, vol. 13, No. 6, pp. 1192-1199, 2007.

Cooper, L.L. et al., "The Effects of Data and Graph Type on Concepts and Visualizations of Variability," In Journal of Statistics Education, Jul. 1, 2010, vol. 18, No. 2, 16 pg.

Edwards, J., "Visualization of Data Flow Graphs for In-Situ Analysis," Doctoral Dissertation, Technische Universitat Berlin, Jul. 31, 2015, 79 pg.

Farooq, H. et al., "An interactive visualization of Genetic Algorithm on 2-D graph," In 10th IEEE Int'l. Conf.on Cognitive Informatics & Cognitive Computing (ICCI* CC), Aug. 2011, pp. 144-151.

(56) References Cited

OTHER PUBLICATIONS

Forbus, T., "Using Evolutionary Algorithms to Generate Multi-view Visualization Layouts," PhD. Diss., University of Oklahoma, 2012, 96 pg.

Gotz, D. et al., "Behavior-driven visualization recommendation," In Proc. Of 14th Int'l. Conf. on Intelligent User Interfaces, pp. 351-324, ACM.

Hart, E. et al., "GAVEL—a new tool for genetic algorithm visualization," In IEEE Transactions on Evolutionary Computation vol. 5, No. 4, 2001, pp. 335-348.

Jain, AK et al., "Statistical pattern recognition: A review," In IEEE Transactions on Pattern Analysis and Machine Intelligence, Jan. 2000, vol. 22, No. 1, pp. 4-37.

Jin, Y. et al., "A Comprehensive Survey Of Fitness Approximation In Evolutionary Computation," In Soft Computing, vol. 9, No. 1, pp. 3-12, Jan. 1, 2005.

Jin, Y. et al., "A framework for evolutionary optimization with approximate fitness functions," IEEE Transactions on Evolutionary Computation. Oct. 2002, vol. 6, No. 5, pp. 481-494.

Wagner, M. et al. "Problem characterization and abstraction for visual analytics in behavior-based malware pattern analysis," In Proc. Of the 11th Workshop on Visualization for Cyber Security, VizSec '14, pp. 9-16, ACM.

Voight, M. et al., "Context-aware recommendation of visualization components," In 4th Int'l. Conf. on Information, Process, and Knowledge Management (eKNOW), Feb. 2012, pp. 101-109.

Sun, Y. et al., "Articulate: A semi-automated model for translating natural language queries into meaningful visualizations," In Int'l. Sym. on Smart Graphics, Jun. 24, 2010, pp. 184-195, Springer, Berlin, Heidelberg.

Kinch, R.J., "Computer-aided design of computer architectures using interactive graphic representation," No. 951-958, University of Illinois at Urbana-Champaign. 1979.

Klimek, J. et al., "Application of the Linked Data Visualization Model on Real World Data from the Czech LOD Cloud," In LDOW 2014, Apr. 2014, 10 pg.

Kosala, R. et al., Web mining research: a SurveyACM Sigkdd Explorations Newsletter, vol. 2, No. 1, pp. 1-15, 2000.

Li, J., "Direct manipulation of integrated documents: an approach to interactively manipulate spatial relationships based on constraint programming techniques," Univ. Royal Inst. Technology Institute of Information, Technical Report TRITA-NA-8901, NADA, 1989.

Lu, J. et al., "Data Visualization of Web Service with Parallel Coordinates and NodeTrix," In 2014 IEEE Int'l. Conf. on Services Computing (SCC), pp. 766-773, 2014.

Mell, P. et al., "The NIST definition of cloud computing," National Institute of Standards and Technology, NIST Special Publication 800-145, Sep. 2011.

Mladenic, D., "Text-learning and related intelligent agents: a Survey," IEEE Intelligent Systems and Their Applications, vol. 14, No. 4, pp. 44-54, 1999.

Nagypal, G. et al., "Applying the semantic web: The VICODI experience in creating visual contextualization for history, "In Literary and Linguistic Computing, Sep. 1, 2005, vol. 20, No. 3, pp. 327-439.

Palotai, Z. et al., "Labelmovie: Semi-supervised machine annotation tool with quality assurance and crowd sourcing options for videos," In IEEEE 12th Int'l. Workshop on Content-Based Multimedia Indexing (CBMI), Jun. 18, 2014, pp. 1-4.

Poli, R. et al. (1991 ). "A Neural Network Expert System for Diagnosing and Treating Hypertension". Computer. vol. 24 , Issue: 3 , Mar. 1991. IEEE. pp. 64-71. DOI: 10.1109/2.73514 (Year: 1991).

Rivera, S. et al., "Proposing a framework for crowd-sourced green infrastructure design," Int'l. Environmental Modelling and Software Society (iEMSs), 7th Int'l Congress on Env. Modelling and software, 2014, 11 pg.

Rusu, D. et al., "Document visualization based on semantic graphs," In IEEE 13th Int'l. Conf. Information Visualisation, pp. 292-297, Jul. 2009.

Sciacca, E., et al., "Visivo workflow-oriented science gateway for astrophysical visualization," In 2013 21st Euromicro Int'l. Conf. on Parallel, Distributed, and Network-Based Processing, pp. 165-177, IEEE, 2013.

Shen, J. et al., "A hybrid learning system for recognizing user tasks from desktop activities and email messages," In ACM Proc. of 11th Int'l. Conf. on Intelligent User Interfaces, Jan. 29, 2006, pp. 86-92.

Sledz, D.A. et al., "A dynamic three-dimensional network visualization program for integration into CyberCIEGE and other network visualization scenarios," Naval Postgraduate School, Monterey, CA, 2007, 135 pg.

* cited by examiner

DETERMINING A COLLECTION OF DATA VISUALIZATIONS

BACKGROUND

The present arrangements relate to data visualization, and more specifically, to managing data visualizations.

A data visualization is a visual representation of data in a graphic format, for example as a graph, plot, chart or other information graphic. Data may be encoded in a visual representation using points, lines, bars, sectors or other visual indicators to visually communicate a quantitative message. Effective data visualization helps users quickly analyze and understand the data. For instance, while a data table may be used to present various data for comparison purposes, a bar chart or pie chart may present the data in a manner that is much more intuitive to the human mind.

SUMMARY

A method includes identifying a set of transition characteristics comprising continuities and discontinuities between data fields and data visualization channels among a plurality of data visualizations by analyzing the plurality of data visualizations and identifying similarities and differences among the data fields and the data visualization channels. The method also can include determining, using a processor, a transition tuple for each of a plurality of pairs of the data visualizations, the transition tuples representing a distribution of the data fields and the data visualization channels across the plurality of data visualizations. The method also can include mapping the transition tuples to a matrix. The method also can include transposing the matrix to generate vectors, each vector representing a type of transition characteristic, at least one of the vectors comprising a plurality of elements equaling a total number of the determined transition tuples. The method also can include determining the distribution of the data fields and the data visualization channels across the plurality of data visualizations by performing statistical analysis on each of the vectors. The method also can include determining a collection of the data visualizations based on the statistical analysis performed on each of the vectors, the collection of the data visualizations comprising at least a subset of the plurality of data visualizations.

A system includes at least one processor programmed to initiate executable operations. The executable operations include identifying a set of transition characteristics comprising continuities and discontinuities between data fields and data visualization channels among a plurality of data visualizations by analyzing the plurality of data visualizations and identifying similarities and differences among the data fields and the data visualization channels. The executable operations also can include determining a transition tuple for each of a plurality of pairs of the data visualizations, the transition tuples representing a distribution of the data fields and the data visualization channels across the plurality of data visualizations. The executable operations also can include mapping the transition tuples to a matrix. The executable operations also can include transposing the matrix to generate vectors, each vector representing a type of transition characteristic, at least one of the vectors comprising a plurality of elements equaling a total number of the determined transition tuples. The executable operations also can include determining the distribution of the data fields and the data visualization channels across the plurality of data visualizations by performing statistical analysis on each of the vectors. The executable operations also can include determining a collection of the data visualizations based on the statistical analysis performed on each of the vectors, the collection of the data visualizations comprising at least a subset of the plurality of data visualizations.

A computer program product includes one or more computer readable storage mediums having program code stored thereon, the program code stored on the one or more computer readable storage mediums collectively executable by a data processing system to initiate operations. The operations include identifying a set of transition characteristics comprising continuities and discontinuities between data fields and data visualization channels among a plurality of data visualizations by analyzing the plurality of data visualizations and identifying similarities and differences among the data fields and the data visualization channels. The operations also can include determining a transition tuple for each of a plurality of pairs of the data visualizations, the transition tuples representing a distribution of the data fields and the data visualization channels across the plurality of data visualizations. The operations also can include mapping the transition tuples to a matrix. The operations also can include transposing the matrix to generate vectors, each vector representing a type of transition characteristic, at least one of the vectors comprising a plurality of elements equaling a total number of the determined transition tuples. The operations also can include determining the distribution of the data fields and the data visualization channels across the plurality of data visualizations by performing statistical analysis on each of the vectors. The operations also can include determining a collection of the data visualizations based on the statistical analysis performed on each of the vectors, the collection of the data visualizations comprising at least a subset of the plurality of data visualizations.

DETAILED DESCRIPTION

Figure 1:
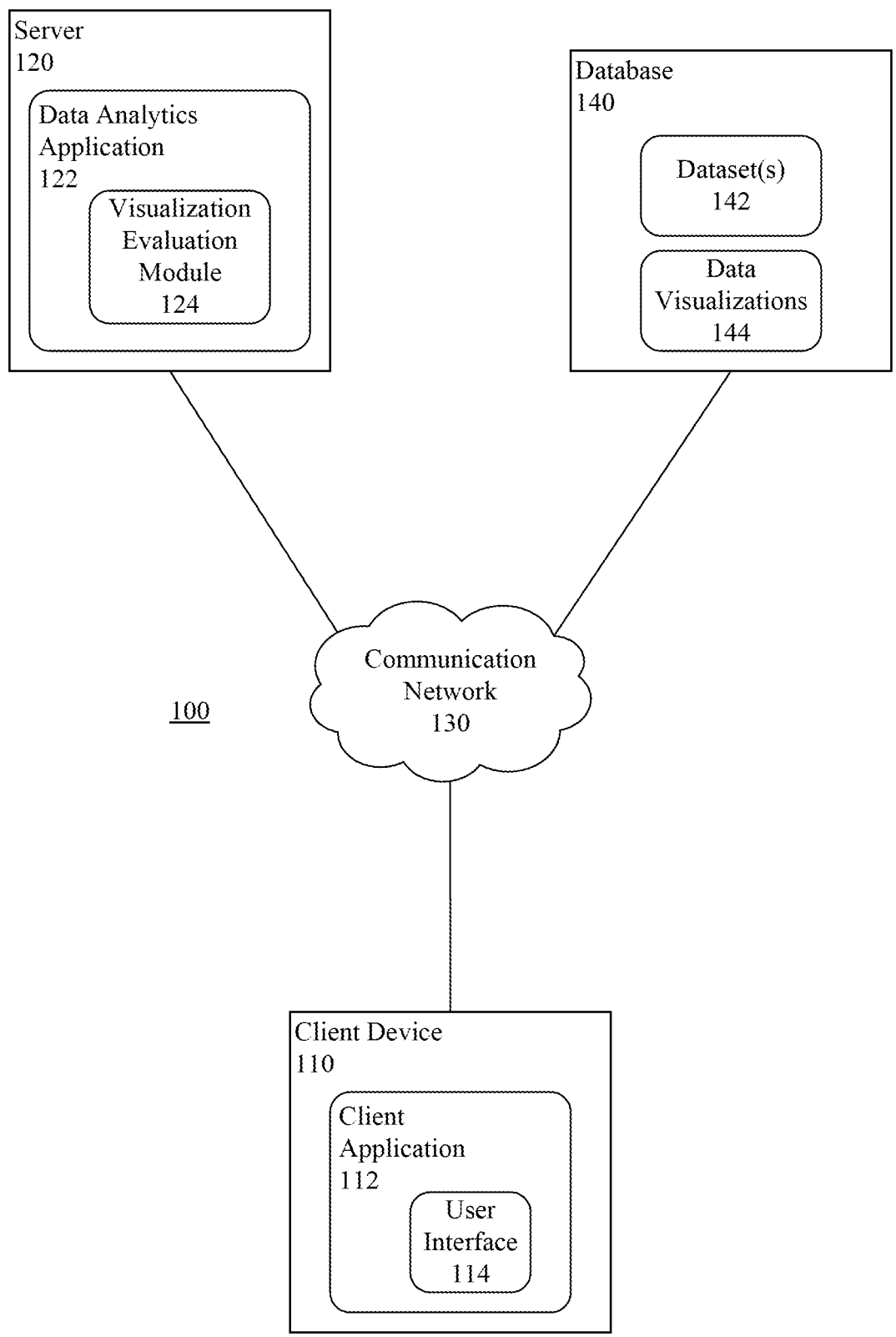
FIG. 1 is a block diagram illustrating an example of a network data processing system.

This disclosure relates to data visualization, and more specifically, to managing data visualizations.

As data sets become increasingly larger and more complex, they become more difficult to analyze and understand. Increasingly, a set or collection of data visualizations may be used to offer insight into the data set, where each data visualization offers a particular view of the data. Within such sets, the relationship between the data visualizations becomes important. For example, the sequence in which the data visualizations are presented may help a user gain a deeper insight into the data.

A data visualization can be thought of as combinations of the mapping of data fields of a data set and data visualization channels (e.g., visual elements or properties). The mapping of data fields and data visualization channels may be different between data visualizations, and this mapping between the data field and data visualization channel combinations define a transition. A transition between data visualizations is connected if there are shared data fields or data visualization channels across the transition.

Within a set of data visualizations, the relationships between individual data visualizations may determine how the individual data visualizations go together. That is, the properties that define the characteristics of the individual data visualizations determine how well the individual data visualizations go together to deliver insight on the data. Individual data visualizations may have enough in common so that a user can connect the dots between the data visualizations, while having enough difference between the data visualizations so that insights offered are unique and worthwhile. For example, a linked transition between a bar chart and a pie chart may help direct attention from the relative sizes of individual groups to how the individual groups compare against the whole set of the groups.

In accordance with the inventive arrangements disclosed herein, a collection of data visualizations can be automatically determined to facilitate user understanding of the data represented by the data visualizations. In illustration, a set of transition characteristics among a plurality of data visualizations can be identified by analyzing the data visualizations and identifying similarities and differences among the data fields and the data visualization channels. The transition characteristics can include, for example, continuities and/or discontinuities between data fields and data visualization channels among the plurality of data visualizations. A distribution of the data fields and the data visualization channels across the plurality of data visualizations can be determined. Based on the distribution of the data fields and the data visualization channels across the plurality of data visualizations, a collection of data visualizations can be determined to effectively convey the meaning of data represented by the data visualizations. The collection of data visualizations can include a subset of the plurality of data visualizations and/or one or more dynamically generated data visualizations. The dynamically generated data visualizations can be generated using data represented by at least one data field among the plurality of data visualizations.

In this regard, parameters for the collection of data visualizations can be specified, and such parameters can be used to guide the selection of data visualizations to include in the collection. For example, a minimum and/or maximum desired level of continuity among the data visualizations to be included in the collection can be specified in order to ensure that the data visualizations are not only related to each other, but also novel from each other. In another example, a degree of one or more types of discontinuity can be specified. For instance, a low degree of a major discontinuity (e.g., data or data type) can be specified, and a high degree of a secondary discontinuity (e.g., data visualization channel) can be specified. Thus, the collection can include different types of data visualizations for the same data or type of data. This can help a user looking for effective data visualization alternatives to present data. Nonetheless, for an expert user in an exploratory environment, a high degree of major discontinuity may be desirable to help the user visualize differences in the data.

Notably, the processes described herein improve the performance of processing systems (e.g., servers) at determining effective data visualization alternatives for presenting data. Indeed, these processes reduce the number of input/output operations performed by a processing system to identify effective data visualization alternatives. Previous to the present arrangements, if a user were searching for various data visualization alternatives for presenting data, the user would sequentially access individual data visualizations. Each access would require a request to be received by the processing system, the processing system to process the request to select a corresponding data visualization, and the processing system to communicate the data visualization to the user. When there were a large number of data visualizations available, the processes would tie up valuable processing resources. The processes described herein reduce the number of requests received by the processing system and corresponding responses, as well as the number of operations performed, to a very low level. Accordingly, processing resources that otherwise would be consumed can be available to perform other data processing functions.

Moreover, not only are request/response operations between the processing system and the user's client device reduced, the number of requests/response operations between the processing system and a database in which the data visualizations are stored also is reduced. As will be appreciated by those skilled in the art, in some computing environments the database may be external to the processing system, and communicatively linked to the processing system via a communication network. The present arrangements can reduce the number of times the processing system accesses the database, thus reducing the overall network usage. For example, each time a processing system access the database via the communication network, a significant part of the communication between the processing system and the system hosting the database includes requests and responses required for authentication, etc. By minimizing the number of accesses to the database, the present arrangements reduce the number of such requests and responses.

Several definitions that apply throughout this document now will be presented.

As defined herein, the term "data visualization" means a visual representation of data in a graphic format configured for presentation on a display. For example, a "data visualization" can be include one or more graphs, plots, charts or other information graphics. As the term "data visualization" is defined herein, a data table is not a data visualization. As the term "data visualization" is defined herein, a data array is not a data visualization.

As defined herein, the term "transition characteristic" means at least one parameter indicating at least one similarity and/or difference among a plurality of data visualizations. For example, a transition characteristic can indicate at least one similarity and/or difference of a data field and/or data visualization channel among a plurality of data visualizations.

As defined herein, the term "data field" means a field in a data visualization representing data contained in at least one functional data structure. A data field can be, for example, a bar in a bar chart or cluster bar chart, a slice in a pie chart, a point on a data plot, a point or line on a graph, etc.

As defined herein, the term "data visualization channel" means a visual element or property of a data visualization. Examples of data visualization channels include, but are not limited to, axes, colors, shapes, etc.

As defined herein, the term "server" means a processing system including at least one processor and memory that provides services shared with other processing systems, for example other servers and/or client devices.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, and so on. Network infrastructure, such as routers, firewalls, switches, access points and the like, are not client devices as the term "client device" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example of a computing environment 100. The computing environment 100 can include at least one client device 110 communicatively linked to a server 120 via a communication network 130. The communication network 130 is the medium used to provide communications links between various devices and data processing systems connected together within the computing environment 100. The communication network 130 may include connections, such as wire, wireless communication links, or fiber optic cables. The communication network 130 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

The client device 110 can execute a client application 112. The client application 112 can include a user interface 114. The client application 112 can be a stand-alone application (e.g., a client application or a mobile application) installed on the client device 110, an application (e.g., web application) accessed by the client device 110 and executed using an operating system or other application (e.g., a web browser) installed on the client device 110, or the client application 112 can be implemented as any other application suitable to be executed by the client device 110. The client application 112 can interface with the server 120 via the communication network 130. The client application 112 can communicate with the server 120 to perform data analysis operations, as well as provide input to and receive output from the server 120. A portion of the data analysis can be performed by the client application 112 based on data from the server 120, or data analysis may be performed by the server 120.

The server 120 can execute a data analytics application 122, which can include a visualization evaluation module 124. The visualization evaluation module 124 can request and receive information about the data visualizations 144 from a database 140, perform analysis operations on the information to generate transition triplets, and output data via an interface to the server 120. The server 120 also can perform additional analysis, formatting and/or other operations, then transmit the information to the client application 112 via the communication network 130 for display by the user interface 114. Such other operations can include, for example, determining a collection of the data visualizations 144 and/or automatically generating one or more new data visualizations 144, as described herein.

Requests for information by the visualization evaluation module 124 can be made via an interface to the data analytics application 122. The data analytics application 122 may communicate with the database 140, which can include one or more datasets 142 and data visualizations 144. In one non-limiting arrangement, the data visualizations 144 may make up a portion of the dataset(s) 142. The dataset(s) 142 and data visualizations 144 are functional data structures that impart functionality when processed by the client device 110 and/or the server 120. The data visualizations 144 may be generated, for example by a user, and organized into sets for evaluation by the visualization evaluation module 124. Alternatively or additionally, the data visualizations 144 may be machine generated. A set of data visualizations 144 may be machine generated, for example using genetic or deep query analysis mechanisms, based on data sources accessed or associated with a particular data visualization. This set of data visualizations 144 may then be passed to the visualization evaluation module for evaluation.

The database 140 can store the dataset(s) 142 along with the data visualizations 144 in one or more computer-readable storage mediums. The database 140 may reside in the server 120, or in another server or a storage system (e.g., a network attached storage) communicatively linked to the server 120. Further, portions of the database 140 may also reside on the client device 110 and may contain replicas, caches, and/or updated/changed data.

At this point it should be noted that although the server 120 and the client device 110 may be implemented as separate components, in another arrangement, rather than using the client device 110, the server 120 can execute the client application 112 and communicate programmatically via an interface and or bus. The server 120 may also be linked to or contain components for generating the data visualizations 144. In yet another arrangement, rather than using the server 120, the client device 110 can execute the data analytics application 122 and the visualization evaluation module 124.

In operation, a user of the client device 110 can, via the user interface 114, indicate a data set 142, or particular data within the data set 142, for which data visualizations are desired. The user also may input criteria and/or characteristics for the desired data visualizations 144. Responsive to the user input(s), the visualization evaluation module 124 can select a plurality of data visualizations 144 for analysis. The data analytics application 122 can randomly select data visualizations 144 that visually represent the desired data or data set 142 or select such data visualizations 144 using an algorithm. Moreover, the data analytics application 122 can use an algorithm generate one or more data visualizations for the user specified data set 142, or particular data within the data set 142, based on the user specified criteria and/or characteristics for the desired data visualizations 144. The data analytics application 122 can add the generated data visualizations to the data visualizations 144 in the database 140.

To select the data visualizations 144, the data analytics application 122 can employ a series of rules created by one or more subject matter experts (SMEs) that identify data visualizations 144 that meet the specified criteria and/or characteristics. Similarly, to generate the data visualizations 144, the data analytics application 122 can employ a series of rules created by one or more SMEs that select predefined data visualization templates that best fit with the specified criteria and/or characteristics.

When applying the series of rules created by one or more SMEs, the data analytics application 122 can implement genetic algorithms to select and/or generate data visualizations that satisfy the specified criteria and/or characteristics. In computing, genetic algorithms may simulate the process of natural selection by representing a solution to a problem through a string of genes (i.e. a chromosome). The chromosome may have a value for a specified finite range or alphabet. For example, if a series of visualizations correspond to the "travelling salesman problem" and the salesman must travel to six points represented by the first six letters of the alphabet, a chromosome representing the visualization may be ACBEDF. Chromosome ACBEDF may illustrate that the salesman travels first to point A, then to point C, then to point B, and so on until the salesman has travelled to all points represented in the chromosome. When beginning an assessment of a visualization, an initial population of chromosomes may be created using various techniques, such as random subsets or complete enumeration of all possible values. For example, when assessing the above mentioned travelling salesman problem, chromosome ACBEDF, chromosome BEFDAC, and chromosome CDBAFE may each be randomly created as an initial population. Each chromosome may represent a different visualization to solve the problem. Furthermore, each point along the salesman's path may be individual actions that make up the visualization. For each generation of chromosomes, the population may be measured using the SME created series of rules to determine the fittest chromosomes within the population. For example, chromosome ACBEDF may be selected as the fittest chromosome among the initial population. Mutations upon chromosome ACBEDF may then be generated. Through an iterative process, the fittest chromosomes in each subsequent generation may be used to generate more chromosomes until a fittest chromosome is determined after a preconfigured number of generations. With respect to data visualizations being selected and/or generated, a fit data visualization may be a visualization that an SME may select as having favorable characteristics when representing a particular data set 142 or data indicated within the data set 142.

According to one arrangement, evolutionary computing techniques, such as genetic and/or deep learning algorithms, may implement a predictive model that mimics natural selection in order to discover a best fit data visualizations 144 across a very broad search spectrum of data visualizations 144. By implementing a training system, a series of data may be collected that relates to the specified criteria and/or characteristics. Using the collected data, the data analytics application 122 can create a series of text and predictive models and employ genetic algorithms using the text and predictive models to assist in determining whether an SME would favor a given data visualization 144. Real-time batch scoring using the created predictive models may provide the fitness function evaluation required by genetic algorithms to assess a set of data visualizations 144.

Figure 2:
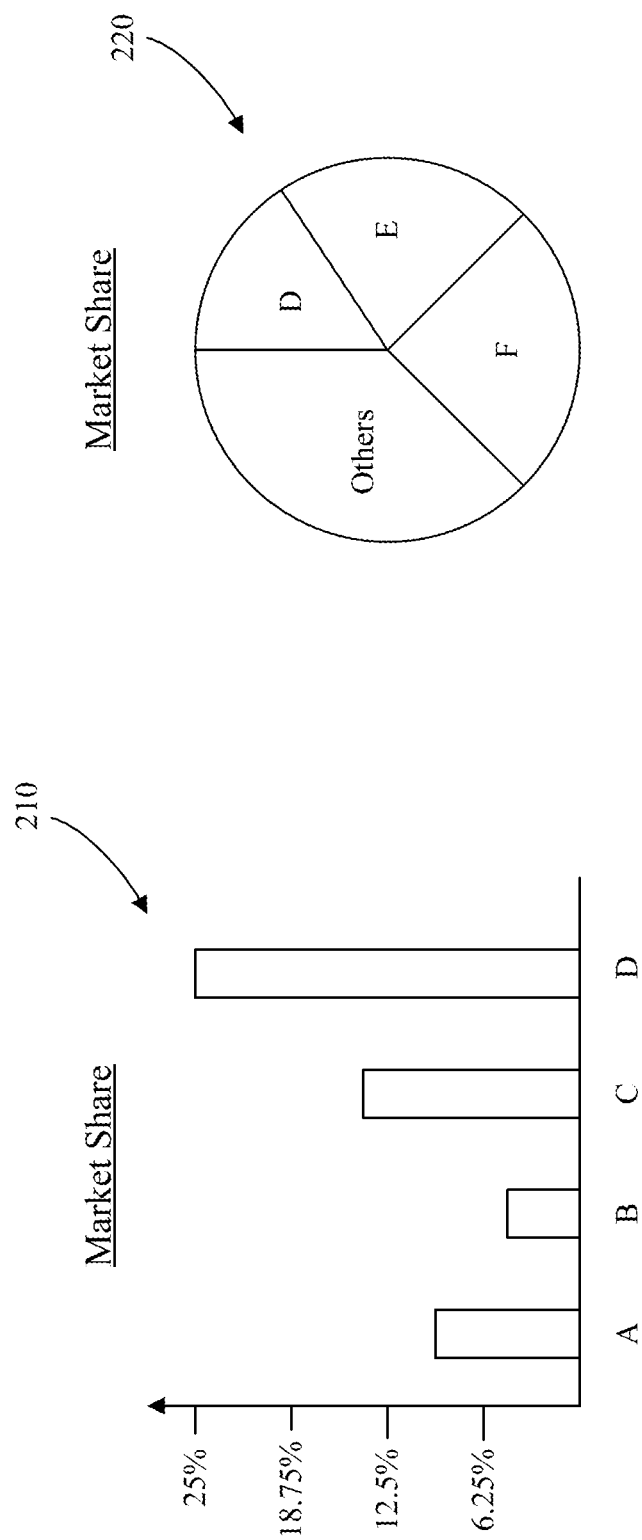
FIG. 2 illustrates an example of a transition between data visualizations.

FIG. 2 illustrates an example of a transition between data visualizations. In this example, a bar chart 210 illustrates a first data visualization and a pie chart 220 illustrates a second data visualization. The bar chart format generally enables easier relative comparisons between groups, which in this example includes groups A, B, C and D, or tracking changes over time. The pie chart format generally allows easier comparison of groups to a whole. The transition between the bar chart 210 data visualization and the pie chart 220 data visualization is related since the data set from which the bar chart 210 and pie chart 220 are generated is the same, while the formatting of the data visualizations differs. Characteristics of the transition (i.e., transition characteristics) can be identified. The transition characteristics can include continuities and/or discontinuities between the data fields and the data visualization channels in the bar chart 210 data visualization and the pie chart 220 data visualization. The transition characteristics between two data visualizations can be represented by, and thus indicated by, a transition tuple, Ct, where:

$Ct = \{Tc, Td, Ts\}$;

Tc indicates a degree of continuity between the data visualizations;

Td indicates a degree of major discontinuity between the data visualizations;

Ts indicates a degree of minor or syntactic discontinuity between the data visualizations.

By way of example, the degree of continuity between the data visualizations, Tc, can indicate the total number of data fields that stay the same. Here, a single data field, D, remains the same for this transition, and so Tc=1. If the data visualizations did not share any data fields, then the degree of continuity would be 0, indicating that there is no continuity for the transition. The degree of major discontinuity, Td, can indicate the absolute difference in the number of channels as well as changed data visualization channels. The data visualization channels, which in this example is "market share," remain the same for both data visualizations and there are no other data field changes, so there is no discontinuity and Td=0. The degree of minor or syntactic discontinuity, Ts, can indicate differences the data visualization channels, for instance switches, visualization properties or other various ways the visualization style may differ, such as a number of axes, colors, filters, chart style mapping, etc. In this example, the chart style mapping changes from a linear bar style chart to a radial pie chart, so Ts=1. Overall, the transition tuple, Ct, describing the higher order transition properties for this transition is Ct={1, 0, 1}, indicating that the transition is more continuous than discontinuous, with only a small number of syntactic changes. The visualization evaluation module 124 of FIG. 1 can process the data visualizations to determine the transition tuple.

In this example, the transition characteristics include the degree of continuity, Tc, the degree of major discontinuity, Td, and the degree of minor or syntactic discontinuity, Ts. Nonetheless, the transition characteristics can include any number of other indications of continuity and/or discontinuity. Accordingly, the transition tuple, Ct, is not limited to Tc, Td and Ts, and may include further continuity and/or discontinuity indicators.

Figure 3:
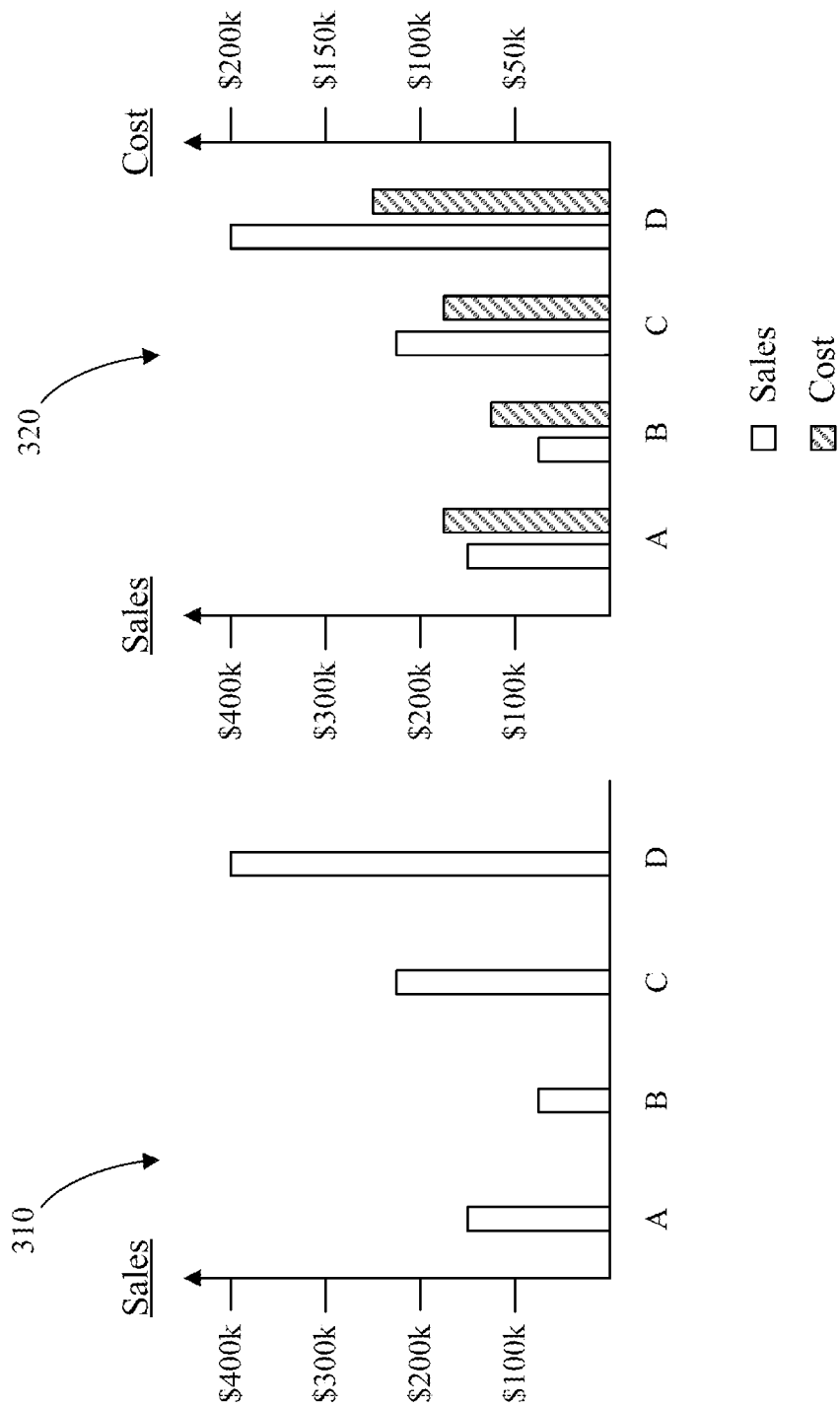
FIG. 3 illustrates another example of a transition between data visualizations.

FIG. 3 illustrates another example of a transition between data visualizations. In this example, a bar chart 310 illustrates a first data visualization and a cluster bar chart 320 illustrates a second data visualization. In the example presented, a single data field, Sales, is common to both data visualizations, so Tc=1. However, an additional data field, Costs, has been included in the cluster bar chart 320. Thus Td=1, indicating that the cluster bar chart 320 includes an additional data field not included in the bar chart 310. In addition, the Costs data field appears as a different color than the Sales data field. This additional color influences the syntactic discontinuity, and thus Ts=1. The overall transition tuple, Ct, for this transition between the bar chart 310 and the cluster bar chart 320 is Ct={1, 1, 1}, indicating that while there are structural differences, there is still a degree continuity, along with small syntactic changes between the first and second data visualizations. As noted, the transition tuple, Ct, is not limited to Tc, Td and Ts, and may include further continuity and/or discontinuity indicators. Again, the visualization evaluation module 124 of FIG. 1 can process the data visualizations to determine the transition tuple.

In the examples described for FIGS. 2 and 3, transition characteristics between two data visualizations are determined. Nonetheless, for each data visualization contained in a set of data visualizations, the visualization evaluation module can apply the described processes to determine transition characteristics between that data visualization and each other data visualization contained in the set. In illustration, assume a set of data visualizations includes three data visualizations, DV1, DV2 and DV3. Thus, a transition tuple, $Ct_{1,2}$ indicating the transition characteristics between DV1 and DV2, a transition tuple, $Ct_{1,3}$ indicating the transition characteristics between DV1 and DV3, and a transition tuple, $Ct_{2,3}$ indicating the transition characteristics between DV2 and DV3 can be determined. Still, the set of data visualizations can include any number of data visualizations, and thus any number of transition tuples can be determined. The total number, M, of determined transition tuples is $M=N(N-1)/2$ where N is the number of data visualizations in the set.

Each of the transition tuples can be mapped into a matrix. The matrix can be transposed to generate vectors for each type of transition characteristic. In illustration, assume $Ct_{1,2}$ {$Tc_{1,2}$, $Td_{1,2}$, $Ts_{1,2}$}, $Ct_{1,3}$={$Tc_{1,3}$, $Td_{1,3}$, $Ts_{1,3}$} and $Ct_{2,3}$={$Tc_{2,3}$, $Td_{2,3}$, $Ts_{2,3}$}. The vectors (Tc', Td', Ts') for the degree of continuity, the degree of major discontinuity and the degree of minor or syntactic discontinuity, respectively, can be determined as follows:

Tc'={$Tc_{1,2}$, $Tc_{1,3}$, $Tc_{2,3}$};
Td'={$Td_{1,2}$, $Td_{1,3}$, $Td_{2,3}$};
Ts'={$Ts_{1,2}$, $Ts_{1,3}$, $Ts_{2,3}$}.

Of course, the number of elements in each vector can be greater if there are more data visualizations in the set. For instance, the number of elements in each vector can equal the total number (M) of determined transition tuples.

The data analytics application 122 (FIG. 1) can perform statistical analysis on each of the vectors Tc', Td', Ts' to determine the distribution of data fields and data visualization channels across the data visualizations. For example, the data analytics application 122 can use statistical analysis techniques known in the art, and apply such statistical analysis techniques to determine, for each vector, a minimum value, a maximum value, an average value, a standard deviation, a spread, variance, skewness, kurtosis, etc. By way of example, if Tc'={2, 1, 3}, the minimum value of the vector Tc' can be determined to be 1, the maximum value of the vector Tc' can be determined to be 3, and the average value of the vector Tc' can be determined to be 2.

Based on the distribution of the data fields and the data visualization channels across the set of data visualizations determined by the statistical analysis, the data analytics application 122 can identify candidate data visualizations to include in a collection of data visualizations, for example based on a specified level of continuity, a specified level of major discontinuity and/or a specified level of minor or syntactic discontinuity between the data visualizations. In this regard, via the user interface 114 of FIG. 1, a user can provide user inputs or selections to specify such criteria (e.g., parameters) to be used to determine the candidate data visualizations. In another arrangement, the data analytics application 122 can use default criteria to determine the candidate data visualizations.

The criteria can be based on desired characteristics for the collection of data visualizations. For example, the criteria can specify a minimum and maximum desired level of continuity Tc among data visualizations and/or specify a low degree of major discontinuity Td among data visualizations. For an expert user in an exploratory environment, a high degree of major discontinuity Td may be desired, and the criteria can specify such. For a novice user or a user looking for effective data visualization alternatives, a low degree of major discontinuity Td may be preferable, and the criteria can specify such. Still, the criteria can specify any of a myriad of desired characteristics for the collection of data visualizations, and the present arrangements are not limited in this regard.

The data analytics application 122 can assign to each candidate data visualization a score indicating how closely the candidate data visualization fits the specified criteria or desired characteristics, or helps the data analytics application 122 determine a collection of data visualizations that converge on desired data visualization characteristics. For example, assume the criteria specifies a minimum desired level of continuity Tc among data visualizations. A data visualization, DV1, that has the minimum desired level of continuity Tc with a large number of other data visualizations can be assigned a higher score than a data visualization, DV2, that has the minimum desired level of continuity Tc with only a small number of other data visualizations. Still, the scores assigned to the various candidate data visualizations can be determined in a myriad of different ways, and the present arrangements are not limited in this regard.

From among the candidate data visualizations, the data analytics application 122 can select the candidate data visualizations having the highest scores to be included in the collection of data visualizations. For example, the data analytics application 122 can select each of the candidate data visualizations that have a score exceeding a threshold value, or the data analytics application 122 can select a specified number of candidate data visualizations having the highest scores. The data analytics application 122 can reject data visualizations contained in the set that are not selected to be included in the collection. In this regard, the determined collection of data visualizations can include at least a subset of the plurality of data visualizations that are analyzed.

In one arrangement, the data analytics application 122 can select and/or generate additional data visualizations and iterate the above processes on the additional data visualizations to select further data visualizations to include in the collection. For example, the data analytics application 122 can iterate the processes until a number of iterations have been performed or until the collection includes a threshold number of data visualizations. The data analytics application 122 can select the additional data visualizations randomly, or select and/or generate the additional data visualizations by employing the previously described rules and/or genetic algorithms.

Responsive to the determination of the collection of data visualizations being complete, the data analytics application 122 can communicate the determined collection to the client application 112 of the client device 110 (FIG. 1), which can present the collection of data visualizations to a user via the user interface 114. The user can choose to save the collection locally on the client device 110 or to another storage location. In one arrangement, the user can select specific data visualizations from the collection, and flag them as being of interest or as not being of interest. The data analytics application 122 can remove from the collection those data visualizations flagged as not being of interest and/or those data visualizations that are not flagged. The user also can enter a user input requesting additional data visualizations.

In response to the user flagging data visualizations as being of interest and/or requesting additional data visualizations, the data analytics application 122 can select and/or generate additional data visualizations and again iterate the above processes to select and/or generate additional data visualizations and add them to the collection. In doing so, the visualization evaluation module 124 can re-compute the transition tuples and vectors, assign greater weight to new data visualization candidates that are closely related to the data visualizations flagged as being of interest, and assign lesser weight to new data visualization candidates that are closely related to the data visualizations that are not flagged or are flagged as not being of interest.

The data analytics application 122 can communicate the newly added data visualizations to the client device 110 for presentation to the user, as previously described, and the process can iterate until the user enters a user input indicating the collection is complete.

Figure 4:
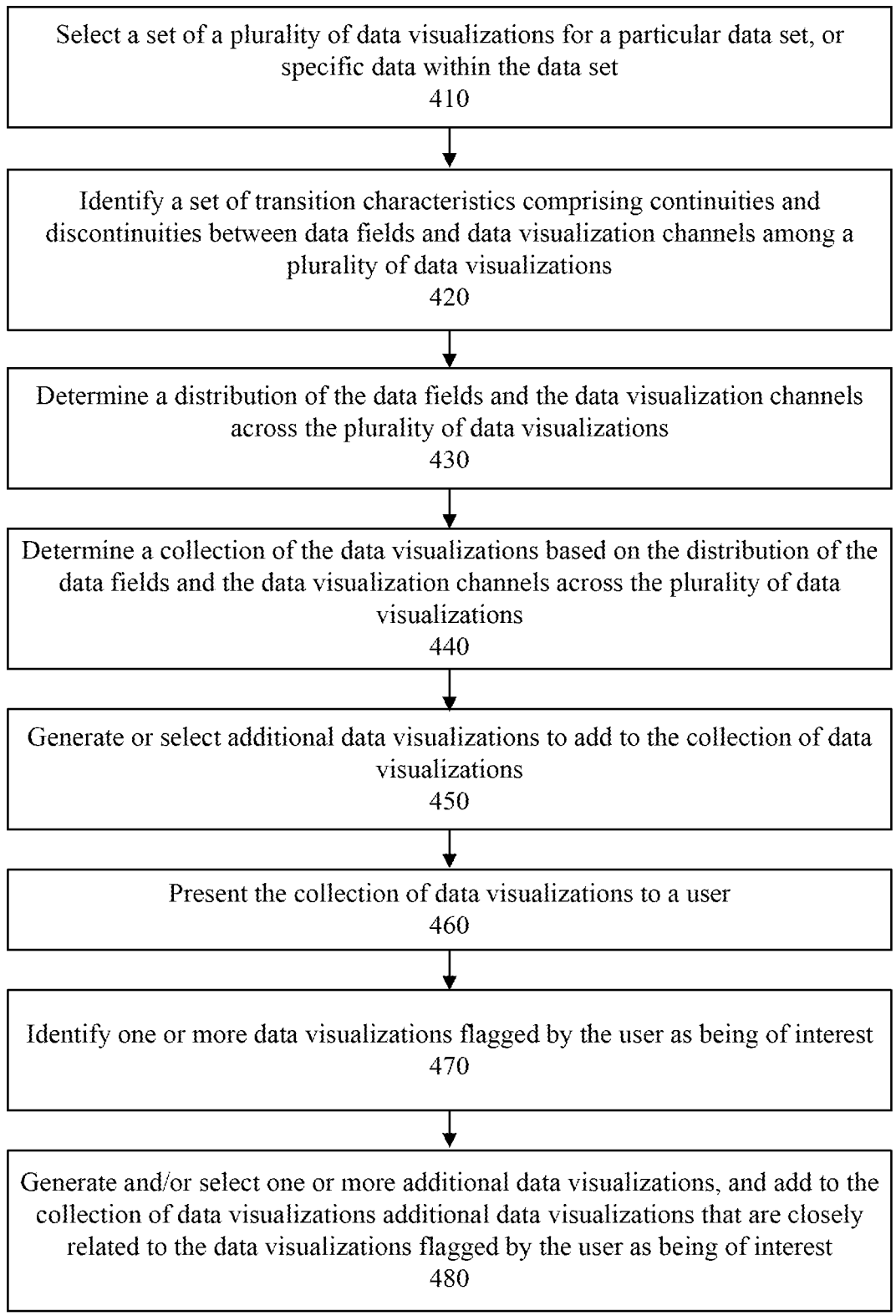
FIG. 4 is a flowchart illustrating an example method of determining a collection of data visualizations.

FIG. 4 is a flowchart illustrating an example method 400 of determining a collection of data visualizations. At step 410, the data analytics application can select a set of a plurality of data visualizations for a particular data set, or specific data within the data set. For example, a user can specify the particular data set, or specific data within the data set, and criteria and/or desired characteristics for the data visualizations. The data analytics application can select the data visualizations for the data set, or specific data, from a database based on user specified criteria and/or desired characteristics for the data visualizations. In one arrangement the data analytics application can automatically generate one or more of the selected data visualizations for the data set, or specific data, based on the criteria and/or desired characteristics. Such data visualizations can be data visualizations not included in the plurality of data visualizations selected from the database.

At step 420, the visualization evaluation module can identify a set of transition characteristics comprising continuities and discontinuities between data fields and data visualization channels among a plurality of data visualizations. The visualization evaluation module can identify a set of transition characteristics by analyzing the plurality of data visualizations and identifying similarities and differences among the data fields and the data visualization channels. For example, for each data visualization contained in the set, the visualization evaluation module can compare the data visualization to each other data visualization contained in the set. Based on each comparison, the visualization evaluation module can generate a respective transition tuple representing the transition characteristics between the compared data visualizations. Step 420 is discussed in greater detail with reference to FIG. 5.

At step 430, the visualization evaluation module can determine a distribution of the data fields and the data visualization channels across the plurality of data visualizations. For example, the visualization evaluation module can enter the generated transition tuples into a matrix, and transpose the matrix to obtain vectors for each type of transition characteristic. Such vectors can indicate the degree of continuity, the degree of major discontinuity and the degree of minor or syntactic discontinuity among the data visualizations. The visualization evaluation module can perform statistical analysis on each of the vectors to determine the distribution of data fields and data visualization channels across the data visualizations.

At step 440, the data analytics application can determine a collection of the data visualizations based on the distribution of the data fields and the data visualization channels across the plurality of data visualizations. The collection of the data visualizations can include at least a subset of the plurality of data visualizations. In illustration, the data analytics application can, on the distribution of the data fields and the data visualization channels across the set of data visualizations determined by the statistical analysis, identify candidate data visualizations to include in a collection of data visualizations, as previously described. Based on the criteria and/or desired characteristics for the data visualizations, the data analytics application can assign a score to each of the candidate data visualizations, and include in the collection the candidate data visualizations receiving the highest scores. For example, the data analytics application can select candidate data visualizations having scores that at least equal a threshold value, or a predetermined number of the candidate data visualizations having scores higher than the remaining candidate data visualizations. Those data visualizations receiving the lowest scores can be rejected. The data analytics application can assign the respective scores responsive to determining the distribution of the data fields and the data visualization channels across the plurality of data visualizations. Each score can indicate how closely a respective candidate data visualization fits the specified criteria or desired characteristics, or helps the data analytics application determine a collection of data visualizations that converge on desired data visualization characteristics.

At step 450 the data analytics application can generate or select additional data visualizations to add to the collection of data visualizations. For example, steps 420-430 can be repeated for the additional data visualizations, and the additional data visualizations can be scored as previously described. The additional data visualizations receiving the highest scores can be added to the collection, and those data visualizations receiving the lowest scores can be rejected. Steps 420-450 can be iterated until a suitable collection of data visualizations is determined. At step 460, the data analytics application can present the collection of data visualizations to a user. For example, the data analytics application can communicate the collection to a client device, and the collection can be presented via a user interface of the client device.

The user may flag one or more data visualizations in the collection as being of interest. The user also may flag certain data visualizations in the collection as not being of interest. At step 470, the data analytics application can identify the data visualizations flagged as being of interest. The data analytics application also can identify the data visualizations flagged as not being of interest or not flagged at all. The data analytics application can remove from the collection those data visualizations flagged as not being of interest and, optionally, remove those data visualizations not flagged at all.

At step 480, the data analytics application can generate and/or select one or more additional data visualizations, and add to the collection of data visualizations additional data visualizations that are closely related to the data visualizations flagged by the user as being of interest. For example, steps 420-450 can be iterated to determine transition characteristics among the data visualizations flagged as being of interest and the additional data visualizations. The transition characteristics can include continuities and discontinuities between data fields and data visualization channels among the additional data visualizations and the at data visualizations that are flagged by a user as being of interest. The data analytics application can determine a distribution of the data fields and the data visualization channels across the additional data visualizations and the data visualizations that are flagged by the user as being of interest. Responsive to determining the distribution of the data fields and the data visualization channels across the additional data visualizations and the data visualizations that are flagged by the user as being of interest, the data analytics application can assign a respective score to each of the additional data visualizations. The data analytics application can evaluate the score assigned to each additional data visualization and, in response, add to the collection of data visualizations each additional data visualization that is assigned a respective score that at least equals a threshold value.

The updated collection can be presented to the user, as previously described.

Figure 5:
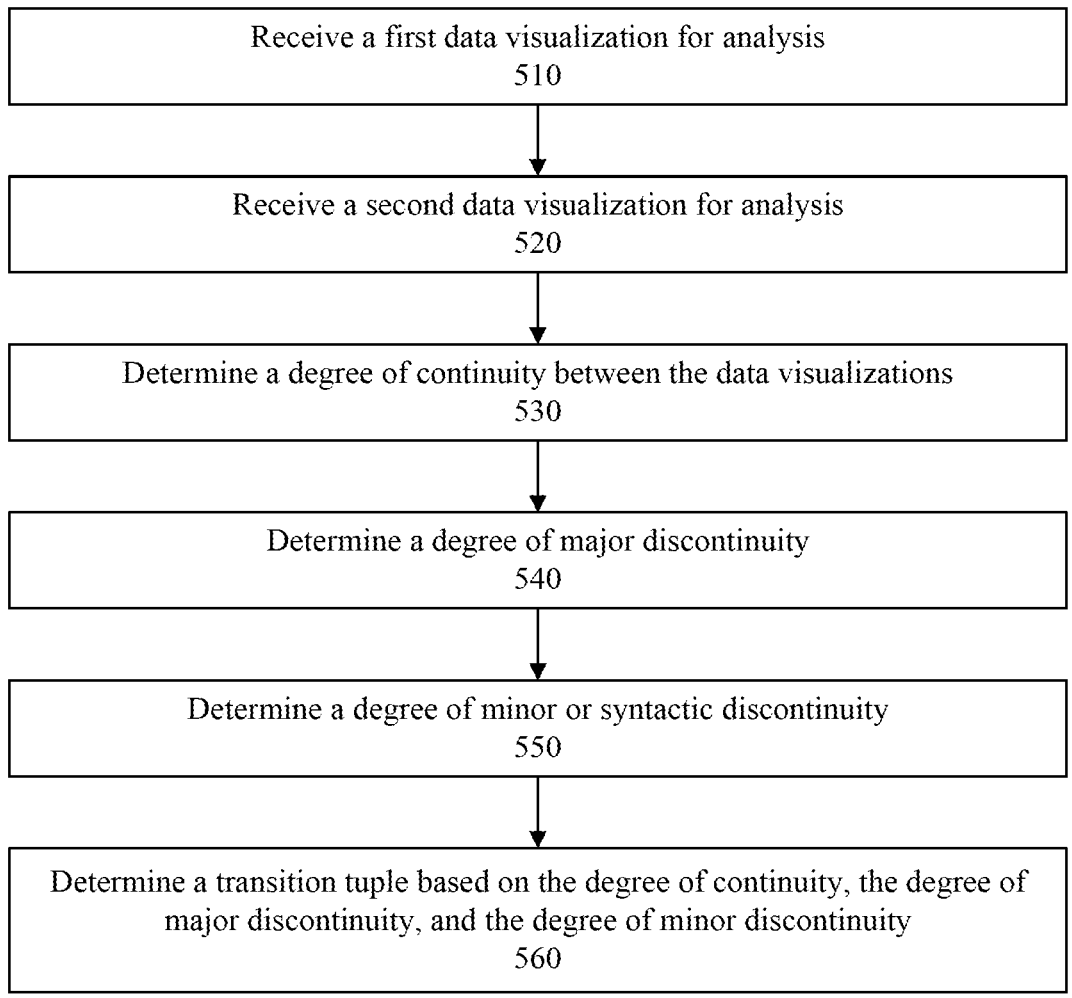
FIG. 5 is a flowchart illustrating an example method of identifying transition characteristics between data visualizations.

FIG. 5 is a flowchart illustrating an example method 500 of identifying transition characteristics between data visualizations. At step 510, the visualization evaluation module can receive a first data visualization for analysis. For example, the visualization evaluation module may be initialized by a data analytics application, which can pass the first data visualization to the visualization evaluation module. Alternatively, a user may initiate a process by which either the data analytics application or the visualization evaluation module requests the first data visualization from a database which, in response, returns the data visualization data.

At step 520, the visualization evaluation module can receive a second data visualization for analysis. The visualization evaluation module can receive the second data visualization in a manner similar to the manner in which the first data visualization is received. The visualization evaluation module also can receive, from the data analytics application, or some other module or component, the second data visualization from a set of data visualizations which are to be evaluated against the first data visualization. For example, the data analytics application may retrieve, or generate, a set of data visualizations for evaluation. This set of data visualizations may have been previously generated along with the first data visualization or otherwise associated with the first data visualization. Further, a user may specify or otherwise indicate a set of data visualizations which may be evaluated against the first data visualization. Alternatively or additionally, a set of data visualizations may be machine generated, for example using genetic or deep query analysis mechanisms and then passed to the visualization evaluation module for evaluation. Individual data visualizations from the set of data visualizations may then be passed to the visualization evaluation module.

At step 530, the visualization evaluation module can determine a degree of continuity between the data visualizations. In illustration, the visualization evaluation module can determine whether there are any data visualization channels and/or data fields common to both data visualizations by comparing the data fields represented in each data visualization channel in the data visualizations to determine whether particular data fields are referenced in both data visualizations. Step 530 is discussed in greater detail with reference to FIG. 5.

At step 540, the visualization evaluation module determines a degree of major discontinuity. The visualization evaluation module may look to see if the number of data visualization channels between the two data visualizations have changed, or compare the number of channels in the first data visualization against the second data visualization. Step 540 is discussed in greater detail with reference to FIG. 6.

At step 550, the visualization evaluation module can determine a degree of minor or syntactic discontinuity. The visualization evaluation module can compare the data visualization channel switches or settings, which may determine data visualizations style, such as size, color, and shape, to determine if these switches or settings are common to both data visualizations. Additionally, the visualization evaluation module can consider various other data visualization properties, such as whether data aggregation/binning, filtering, or disaggregation, have been applied. Step 550 is discussed in greater detail with reference to FIG. 7.

At step 560, a transition tuple is determined based on the degree of continuity, the degree of major discontinuity, and the degree of minor discontinuity. For example, the transition tuple may be assembled based on the number of data field and data visualization channel combination used in both the first and second data visualizations, the difference in the number of data visualization channels between the first and second data visualizations, and various switches and data visualization properties applied to one of the data visualization channels to yield a transition tuple, such as {1, 1, 1}.

Figure 6:
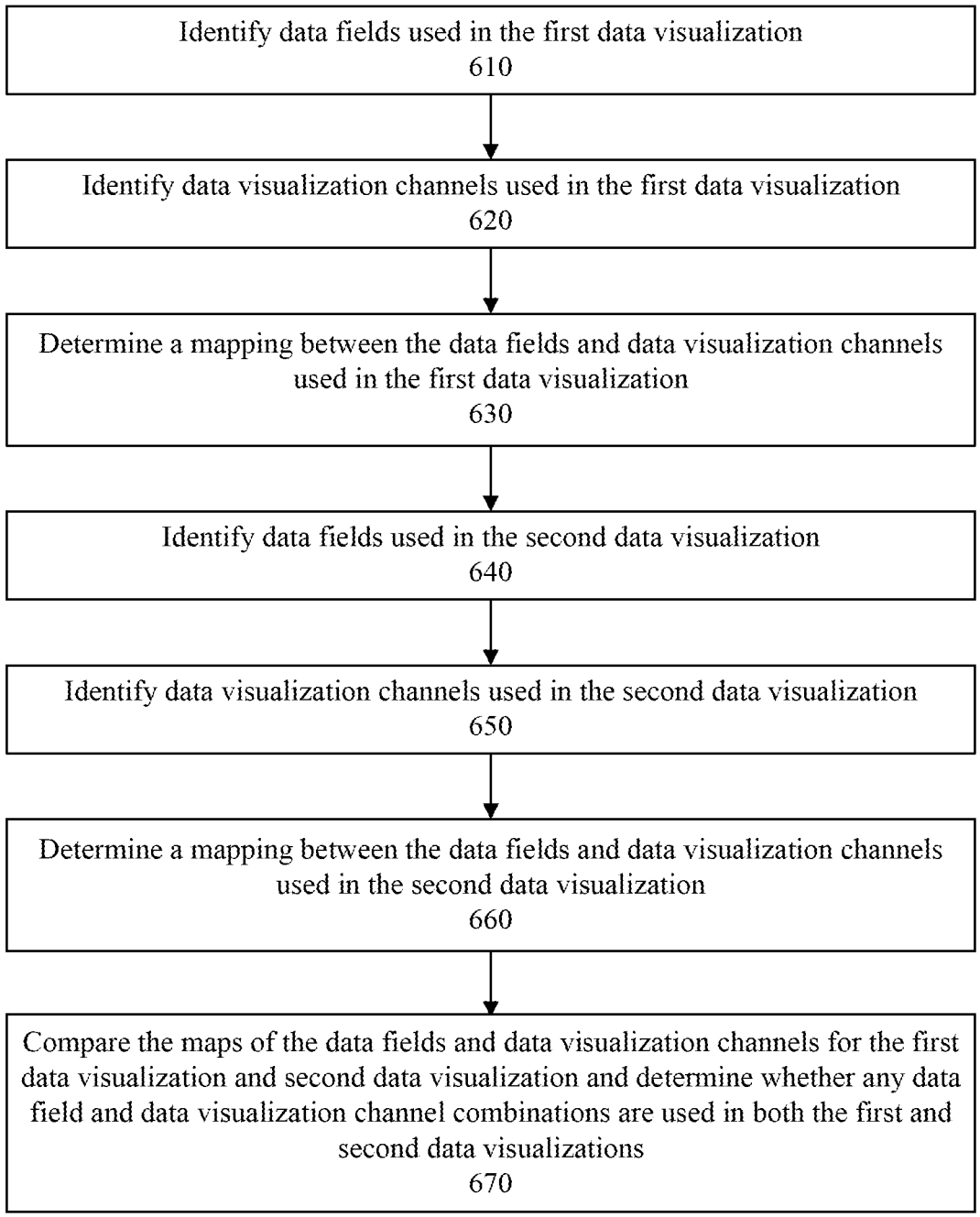
FIG. 6 is a flowchart illustrating an example method of determining a degree of continuity between data visualizations.

FIG. 6 is a flowchart illustrating an example method 600 of determining a degree of continuity between data visualizations. At step 610, the visualization evaluation module can identify data fields used in the first data visualization. This may be done, for example, by examining the data fields referenced by the first data visualization. At step 620, the visualization evaluation module can identify data visualization channels used in the first data visualization. To visualize a particular data field, that data field is associated with a particular data visualization channel. For example, a number of sales may be associated with the y-axis of a bar chart. At step 630, the visualization evaluation module can determine a mapping between the data fields and data visualization channels used in the first data visualization. This mapping may consist of the set of associations between a particular data field and a particular data visualization channel. At step 640, the visualization evaluation module can identify data fields used in the second data visualization. At step 650, the visualization evaluation module can identify data visualization channels used in the second data visualization. At step 660, the visualization evaluation module can determine a mapping between the data fields and data visualization channels used in the second data visualization. Although shown as sequential steps, operations on the first and second data visualizations may be performed as parallel operations. At step 670, the visualization evaluation module can compare the maps of the data fields and data visualization channels for the first data visualization and second data visualization and determine whether any data field and data visualization channel combinations are used in both the first and second data visualizations. The number of data field and data visualization channel combinations common to both the first and second data visualizations may be used as a part of the transition tuple.

Figure 7:
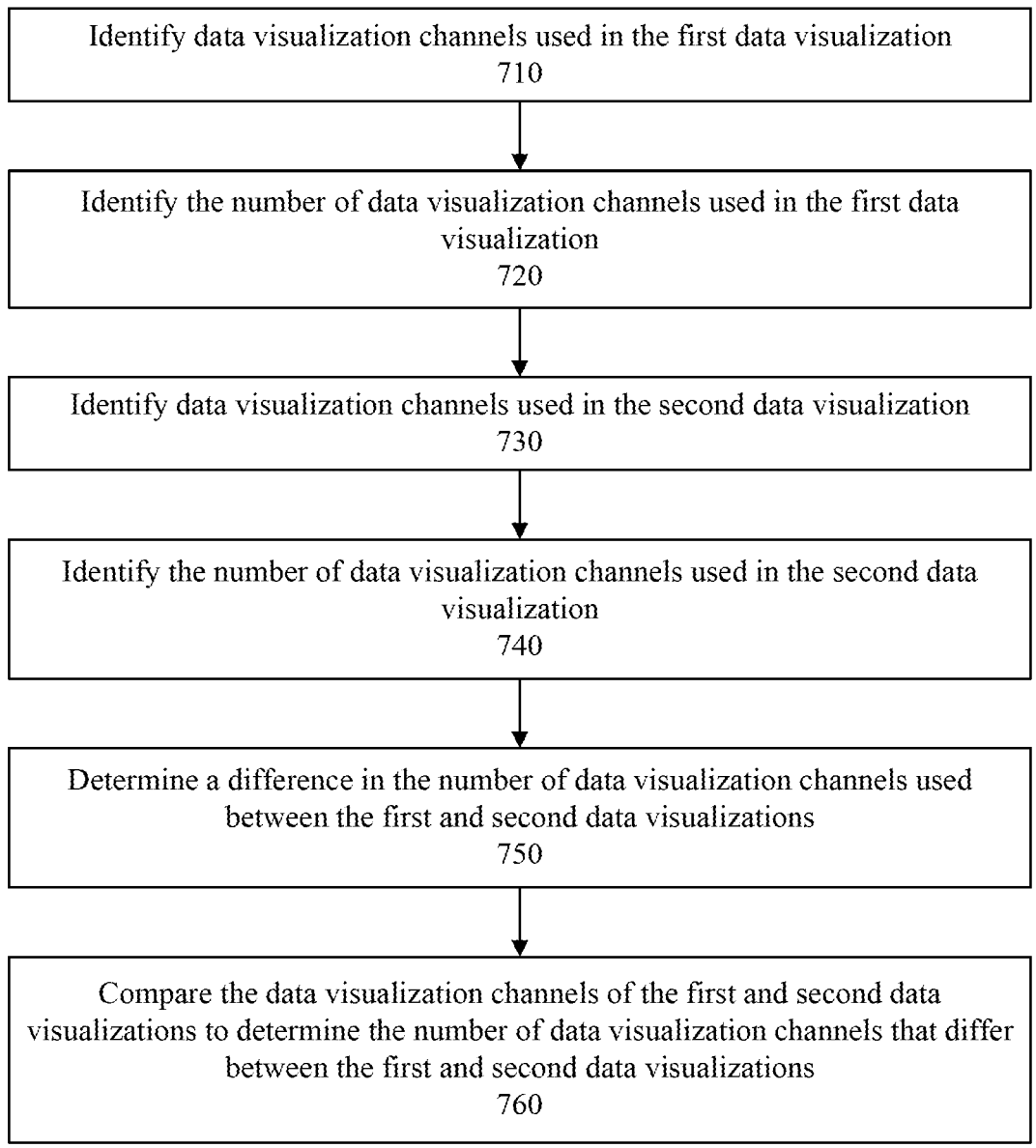
FIG. 7 is a flowchart illustrating an example method of determining a degree of major structural discontinuity between data visualizations.

FIG. 7 is a flowchart illustrating an example method 700 of determining a degree of major structural discontinuity between data visualizations. At step 710, the visualization evaluation module can identify data visualization channels used in the first data visualization. At step 720, the visualization evaluation module can identify the number of data visualization channels used in the first data visualization. This may be performed, for example, by looping though all the identified data visualization channels of the first data visualization and incrementing a counter. At step 730, the visualization evaluation module can identify data visualization channels used in the second data visualization. At step 740, the visualization evaluation module can identify the number of data visualization channels used in the second data visualization. Although shown as sequential steps, operations on the first and second data visualizations may be performed as parallel operations.

At step 750, the visualization evaluation module can determine a difference in the number of data visualization channels used between the first and second data visualizations. However, while the number of channels may stay the same during a transition, the channels themselves may be different channels between the first and second data visualizations. At step 760, the visualization evaluation module can compare the data visualization channels of the first and second data visualizations to determine the number of data visualization channels that differ between the first and second data visualizations. The difference in the number of data visualization channels and the number of data visualization channels that are different between the first and second data visualizations may be combined, for example, summed or averaged, to determine the major structural discontinuity indicator of the transition tuple.

Figure 8:
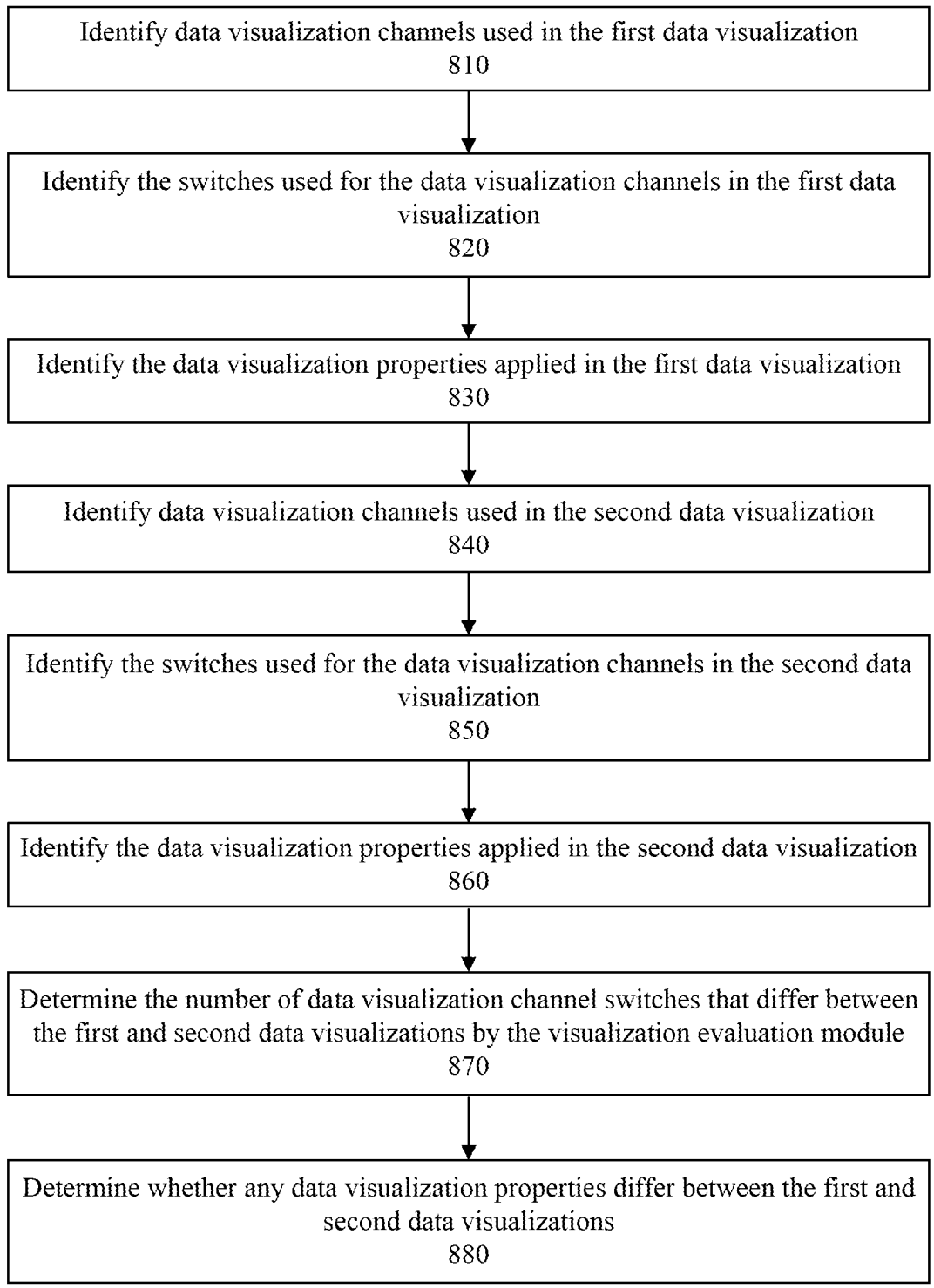
FIG. 8 is a flowchart illustrating an example method of determining a degree of minor discontinuity between data visualizations.

FIG. 8 is a flowchart illustrating an example method 800 of determining a degree of minor discontinuity between data visualizations. At step 810, the visualization evaluation module can identify data visualization channels used in the first data visualization. Data visualization style, such as size, color, and type influencing how a particular data visualization channel may look, may be adjusted based on switches applied to particular data visualization channels. At step 820, the visualization evaluation module can identify the switches used for the data visualization channels in the first data visualization. Other data visualization properties may also influence how data is presented, such as whether data has been aggregated or binned, filtered, or disaggregated. At step 830, the visualization evaluation module can identify the data visualization properties applied in the first data visualization. At step 840, the visualization evaluation module can identify data visualization channels used in the second data visualization. At step 850, the visualization evaluation module can identify the switches used for the data visualization channels in the second data visualization. At step 860, the visualization evaluation module can identify the data visualization properties applied in the second data visualization. Although shown as sequential steps, operations on the first and second data visualizations may be performed as parallel operations. At step 870, the visualization evaluation module can determine the number of data visualization channel switches that differ between the first and second data visualizations by the visualization evaluation module. The differences in data visualization channel switches may take into account data transposes where, for example, the same colors are applied, but the data visualization channels to which the colors are applied are switched. At step 880, the visualization evaluation module can determine whether any data visualization properties differ between the first and second data visualizations. The number of changed switched and data visualization properties between the first and second data visualizations may be combined, for example, summed or averaged, to determine the minor, or syntactic discontinuity indicator of the transition tuple.

Figure 9:
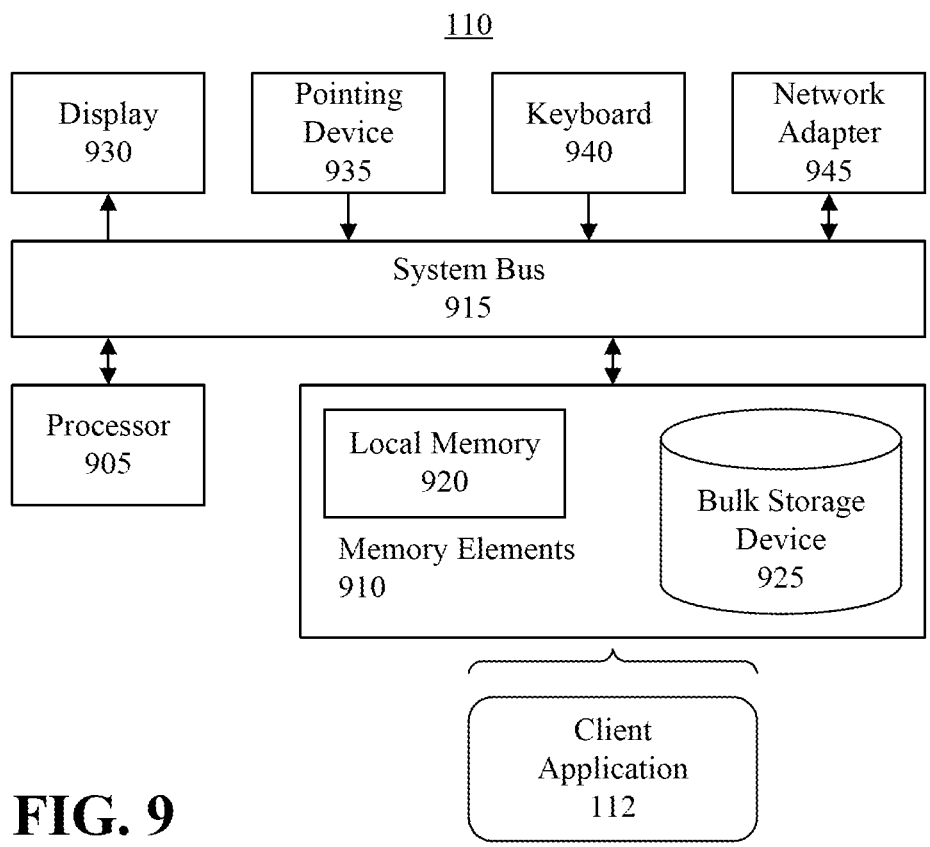
FIG. 9 is a block diagram illustrating example architecture for a client device.

FIG. 9 is a block diagram illustrating example architecture for the client device 110. The client device 110 can include at least one processor 905 (e.g., a central processing unit) coupled to memory elements 910 through a system bus 915 or other suitable circuitry. As such, the client device 110 can store program code within the memory elements 910. The processor 905 can execute the program code accessed from the memory elements 910 via the system bus 915. It should be appreciated that the client device 110 can be implemented in the form of any system including a processor and memory that is capable of performing the functions and/or operations described within this specification.

The memory elements 910 can include one or more physical memory devices such as, for example, local memory 920 and one or more bulk storage devices 925. Local memory 920 refers to random access memory (RAM) or other non-persistent memory device(s) generally used during actual execution of the program code. The bulk storage device(s) 925 can be implemented as a hard disk drive (HDD), solid state drive (SSD), or other persistent data storage device. The client device 110 also can include one or more cache memories (not shown) that provide temporary storage of at least some program code in order to reduce the number of times program code must be retrieved from the bulk storage device 925 during execution.

Input/output (I/O) devices such as a display 930, and, optionally, a pointing device 935 and/or keyboard 940 can be coupled to the client device 110. The I/O devices can be coupled to the client device 110 either directly or through intervening I/O controllers. For example, the display 930 can be coupled to the client device 110 via a graphics processing unit (GPU), which may be a component of the processor 905 or a discrete device. One or more network adapters 945 also can be coupled to client device 110 to enable the client device 110 to become coupled to other systems, computer systems, remote printers, and/or remote storage devices through intervening private or public networks. Modems, cable modems, transceivers, and Ethernet cards are examples of different types of network adapters 945 that can be used with the client device 110.

As pictured in FIG. 9, the memory elements 910 can store the client application 112, which can include the user interface 114 depicted in FIG. 1. Being implemented in the form of executable program code, the client application 112 can be executed by the client device 110 and, as such, can be considered part of the client device 110. Moreover, the client application 112 is functional data structure that imparts functionality when employed as part of the client device 110.

Figure 10:
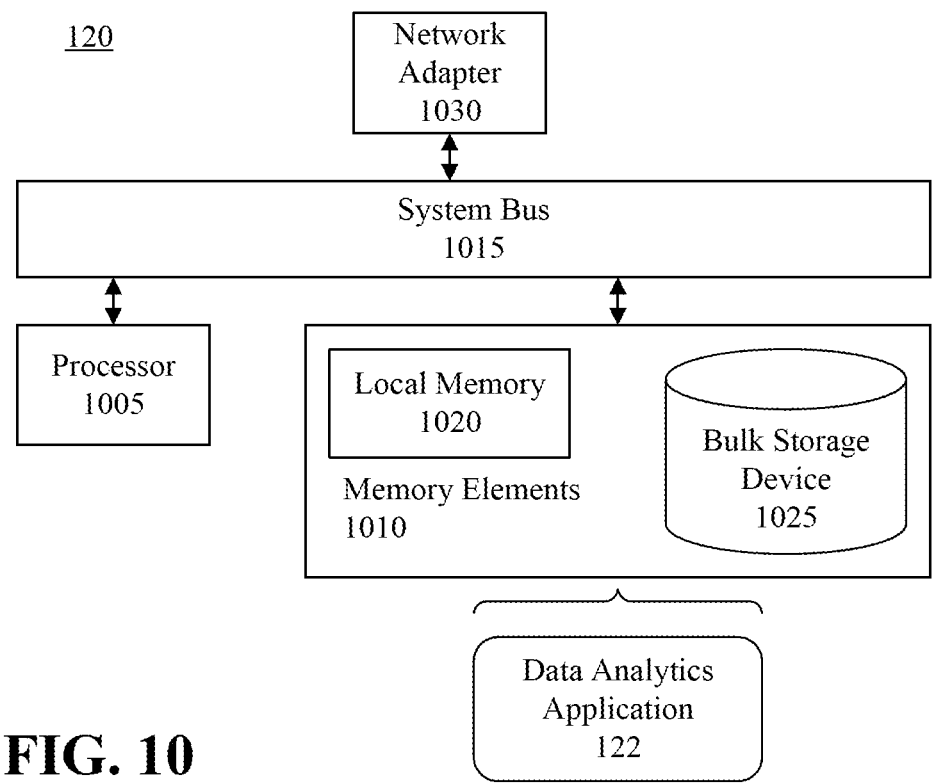
FIG. 10 is a block diagram illustrating example architecture for a server.

FIG. 10 is a block diagram illustrating example architecture for the server 120. The server 120 can include at least one processor 1005 (e.g., a central processing unit) coupled to memory elements 1010 through a system bus 1015 or other suitable circuitry. As such, the server 120 can store program code within the memory elements 1010. The processor 1005 can execute the program code accessed from the memory elements 1010 via the system bus 1015. It should be appreciated that the server 120 can be implemented in the form of any system including a processor and memory that is capable of performing the functions and/or operations described within this specification. For example, the server 120 can be implemented as a single processing system or a plurality of communicatively linked processing systems.

The memory elements 1010 can include one or more physical memory devices such as, for example, local memory 1020 and one or more bulk storage devices 1025. The server 120 also can include one or more cache memories (not shown) that provide temporary storage of at least some program code in order to reduce the number of times program code must be retrieved from the bulk storage device 1025 during execution.

One or more network adapters 1030 also can be coupled to server 120 to enable the server 120 to become coupled to other systems, computer systems, remote printers, and/or remote storage devices through intervening private or public networks. Modems, cable modems, transceivers, and Ethernet cards are examples of different types of network adapters 1030 that can be used with the server 120.

As pictured in FIG. 10, the memory elements 1010 can store the data analytics application 122, which can include the visualization evaluation module 124 depicted in FIG. 1. Being implemented in the form of executable program code, the data analytics application 122 can be executed by the server 120 and, as such, can be considered part of the server 120. Moreover, the data analytics application 122 is a functional data structure that imparts functionality when employed as part of the server 120.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying a set of transition characteristics comprising continuities and discontinuities between data fields and data visualization channels among a plurality of data visualizations by analyzing the plurality of data visualizations and identifying similarities and differences among the data fields and the data visualization channels;
determining, using a processor, a transition tuple for each of a plurality of pairs of the data visualizations, the transition tuples representing a distribution of the data fields and the data visualization channels across the plurality of data visualizations;
mapping the transition tuples to a matrix;
generating vectors by transposing the matrix, each vector representing a type of transition characteristic, wherein the generating the vectors comprises generating at least one vector indicating a degree of continuity between the plurality of data visualizations and comprising a plurality of elements equaling a total number of the determined transition tuples;
determining the distribution of the data fields and the data visualization channels across the plurality of data visualizations by performing statistical analysis on each of the vectors;
determining a collection of the data visualizations based on the statistical analysis performed on each of the vectors, the collection of the data visualizations comprising at least a subset of the plurality of data visualizations; and
communicating the collection of the data visualizations to a client device, wherein the client device presents the collection of the data visualizations to a user via a user interface of the client device.

2. The method of claim 1, further comprising:
responsive to the determining the distribution of the data fields and the data visualization channels across the plurality of data visualizations, assigning a score to each of a plurality of candidate data visualizations, each score indicating how closely a respective candidate data visualization fits specified criteria or desired characteristics;
wherein determining the collection of the data visualizations based on statistical analysis performed on each of the vectors comprises selecting candidate data visualizations that have respective scores that exceed a threshold value.

3. The method of claim 2, further comprising:
identifying the candidate data visualizations based on a specified level of continuity between the data visualizations.

4. The method of claim 2, further comprising:
identifying the candidate data visualizations based on at least one type of transition characteristic selected from a group consisting of a specified level of major discontinuity between the data visualizations, and a specified level of minor or syntactic discontinuity between the data visualizations.

5. The method of claim 1, further comprising:
responsive to determining the distribution of the data fields and the data visualization channels across the plurality of data visualizations, assigning a score to each of a plurality of candidate data visualizations, each score indicating how closely a respective candidate data visualization fits specified criteria or desired characteristics;
wherein determining the collection of the data visualizations based on the distribution of the data fields and the data visualization channels across the plurality of data visualizations comprises selecting a specified number of the candidate data visualizations having highest scores.

6. The method of claim 1, further comprising:
identifying at least one data visualization in the collection of the data visualizations that is flagged by a user as being of interest;
responsive to identifying the at least one data visualization in the collection of the data visualizations that is flagged by the user as being of interest, generating or selecting at least one additional data visualization;
identifying a second set of transition characteristics comprising continuities and discontinuities between data fields and data visualization channels among the at least one additional data visualization and the at least one data visualization that is flagged by the user as being of interest;
determining a distribution of the data fields and the data visualization channels across the at least one additional data visualization and the at least one data visualization that is flagged by the user as being of interest;
responsive to determining the distribution of the data fields and the data visualization channels across the at least one additional data visualization and the at least one data visualization that is flagged by a user as being of interest, assigning at least one respective score to the at least one additional data visualization; and
responsive to the at least one score at least equaling a threshold value, adding the at least one additional data visualization to the collection of the data visualizations.

7. The method of claim 1, wherein the determining the collection of the data visualizations comprises:
implementing genetic algorithms to select the data visualizations that satisfy specified criteria, the genetic algorithms simulating a process of natural selection by representing a solution to a problem through a string of simulated genes.

8. A system, comprising:
at least one processor programmed to initiate executable operations comprising:
identifying a set of transition characteristics comprising continuities and discontinuities between data fields and data visualization channels among a plurality of data visualizations by analyzing the plurality of data visualizations and identifying similarities and differences among the data fields and the data visualization channels;
determining a transition tuple for each of a plurality of pairs of the data visualizations, the transition tuples representing a distribution of the data fields and the data visualization channels across the plurality of data visualizations;
mapping the transition tuples to a matrix;
generating vectors by transposing the matrix, each vector representing a type of transition characteristic, wherein the generating the vectors comprises generating at least one vector indicating a degree of continuity between the plurality of data visualizations and comprising a plurality of elements equaling a total number of the determined transition tuples;
determining the distribution of the data fields and the data visualization channels across the plurality of data visualizations by performing statistical analysis on each of the vectors;
determining a collection of the data visualizations based on the statistical analysis performed on each of the vectors, the collection of the data visualizations comprising at least a subset of the plurality of data visualizations; and communicating the collection of the data visualizations to a client device, wherein the client device presents the collection of the data visualizations to a user via a user interface of the client device.

9. The system of claim 8, the executable operations further comprising:
responsive to the determining the distribution of the data fields and the data visualization channels across the plurality of data visualizations, assigning a score to each of a plurality of candidate data visualizations, each score indicating how closely a respective candidate data visualization fits specified criteria or desired characteristics;
wherein determining the collection of the data visualizations based on statistical analysis performed on each of the vectors comprises selecting candidate data visualizations that have respective scores that exceed a threshold value.

10. The system of claim 9, the executable operations further comprising:
identifying the candidate data visualizations based on a specified level of continuity between the data visualizations.

11. The system of claim 9, the executable operations further comprising:
identifying the candidate data visualizations based on at least one type of transition characteristic selected from a group consisting of a specified level of major discontinuity between the data visualizations and a specified level of minor or syntactic discontinuity between the data visualizations.

12. The system of claim 8, the executable operations further comprising:
responsive to determining the distribution of the data fields and the data visualization channels across the plurality of data visualizations, assigning a score to each of a plurality of candidate data visualizations, each score indicating how closely a respective candidate data visualization fits specified criteria or desired characteristics;
wherein determining the collection of the data visualizations based on the distribution of the data fields and the data visualization channels across the plurality of data visualizations comprises selecting a specified number of the candidate data visualizations having highest scores.

13. The system of claim 8, the executable operations further comprising:
identifying at least one data visualization in the collection of the data visualizations that is flagged by a user as being of interest;
responsive to identifying the at least one data visualization in the collection of the data visualizations that is flagged by the user as being of interest, generating or selecting at least one additional data visualization;
identifying a second set of transition characteristics comprising continuities and discontinuities between data fields and data visualization channels among the at least one additional data visualization and the at least one data visualization that is flagged by the user as being of interest;
determining a distribution of the data fields and the data visualization channels across the at least one additional data visualization and the at least one data visualization that is flagged by the user as being of interest;
responsive to determining the distribution of the data fields and the data visualization channels across the at least one additional data visualization and the at least one data visualization that is flagged by a user as being of interest, assigning at least one respective score to the at least one additional data visualization; and
responsive to the at least one score at least equaling a threshold value, adding the at least one additional data visualization to the collection of the data visualizations.

14. The system of claim 8, wherein the determining the collection of the data visualizations comprises:
implementing genetic algorithms to select the data visualizations that satisfy specified criteria, the genetic algorithms simulating a process of natural selection by representing a solution to a problem through a string of simulated genes.

15. A computer program product, comprising:
one or more computer readable storage mediums having program code stored thereon, the program code stored on the one or more computer readable storage mediums collectively executable by a data processing system to initiate operations including:
identifying a set of transition characteristics comprising continuities and discontinuities between data fields and data visualization channels among a plurality of data visualizations by analyzing the plurality of data visualizations and identifying similarities and differences among the data fields and the data visualization channels;
determining a transition tuple for each of a plurality of pairs of the data visualizations, the transition tuples representing a distribution of the data fields and the data visualization channels across the plurality of data visualizations;
mapping the transition tuples to a matrix;
generating vectors by transposing the matrix, each vector representing a type of transition characteristic, wherein the generating the vectors comprises generating at least one vector indicating a degree of continuity between the plurality of data visualizations and comprising a plurality of elements equaling a total number of the determined transition tuples;
determining the distribution of the data fields and the data visualization channels across the plurality of data visualizations by performing statistical analysis on each of the vectors;
determining a collection of the data visualizations based on the statistical analysis performed on each of the vectors, the collection of the data visualizations comprising at least a subset of the plurality of data visualizations; and
communicating the collection of the data visualizations to a client device, wherein the client device presents the collection of the data visualizations to a user via a user interface of the client device.

16. The computer program product of claim 15, the operations further comprising:
responsive to the determining the distribution of the data fields and the data visualization channels across the plurality of data visualizations, assigning a score to each of a plurality of candidate data visualizations, each score indicating how closely a respective candidate data visualization fits specified criteria or desired characteristics;
wherein determining the collection of the data visualizations based on statistical analysis performed on each of the vectors comprises selecting candidate data visualizations that have respective scores that exceed a threshold value.

17. The computer program product of claim 16, the operations further comprising:
  identifying the candidate data visualizations based on a specified level of continuity between the data visualizations.

18. The computer program product of claim 16, the operations further comprising:
  identifying the candidate data visualizations based on at least one type of transition characteristic selected from a group consisting of a specified level of major discontinuity between the data visualizations, and a specified level of minor or syntactic discontinuity between the data visualizations.

19. The computer program product of claim 15, the operations further comprising:
  responsive to determining the distribution of the data fields and the data visualization channels across the plurality of data visualizations, assigning a score to each of a plurality of candidate data visualizations, each score indicating how closely a respective candidate data visualization fits specified criteria or desired characteristics;
  wherein determining the collection of the data visualizations based on the distribution of the data fields and the data visualization channels across the plurality of data visualizations comprises selecting a specified number of the candidate data visualizations having highest scores.

20. The computer program product of claim 15, the operations further comprising:
  identifying at least one data visualization in the collection of the data visualizations that is flagged by a user as being of interest;
  responsive to identifying the at least one data visualization in the collection of the data visualizations that is flagged by the user as being of interest, generating or selecting at least one additional data visualization;
  identifying a second set of transition characteristics comprising continuities and discontinuities between data fields and data visualization channels among the at least one additional data visualization and the at least one data visualization that is flagged by the user as being of interest;
  determining a distribution of the data fields and the data visualization channels across the at least one additional data visualization and the at least one data visualization that is flagged by the user as being of interest;
  responsive to determining the distribution of the data fields and the data visualization channels across the at least one additional data visualization and the at least one data visualization that is flagged by a user as being of interest, assigning at least one respective score to the at least one additional data visualization; and
  responsive to the at least one score at least equaling a threshold value, adding the at least one additional data visualization to the collection of the data visualizations.

* * * * *